United States Patent
Svoboda et al.

(10) Patent No.: US 7,595,085 B2
(45) Date of Patent: Sep. 29, 2009

(54) CERAMIC ASSEMBLY WITH A STABILIZER LAYER

(75) Inventors: Robert J. Svoboda, Swartz Creek, MI (US); Haskell Simpkins, Grand Blanc, MI (US); Joseph M. Keller, Grand Blanc, MI (US); Vincent L. Sprenkle, Richland, WA (US); Kerry D. Meinhardt, Kennewick, WA (US); Nathan L. Canfield, Kennewick, WA (US)

(73) Assignees: Delphi Technologies, Inc., Troy, MI (US); Battelle Memorial Institute, Richland, WA (US)

( * ) Notice: Subject to any disclaimer, the term of this patent is extended or adjusted under 35 U.S.C. 154(b) by 998 days.

(21) Appl. No.: 10/797,301

(22) Filed: Mar. 9, 2004

(65) Prior Publication Data

US 2005/0202159 A1   Sep. 15, 2005

(51) Int. Cl.
*B05D 5/12*   (2006.01)
(52) U.S. Cl. .................. 427/115; 427/58; 427/240; 427/245; 429/27; 429/30; 429/40; 429/45
(58) Field of Classification Search ............... 427/58, 427/115, 240, 245; 429/40, 45, 27, 30
See application file for complete search history.

(56) References Cited

U.S. PATENT DOCUMENTS

| | | | |
|---|---|---|---|
| 5,670,270 A | 9/1997 | Wallin | 429/33 |
| 5,750,279 A | 5/1998 | Carolan et al. | |
| 5,803,934 A | 9/1998 | Carter | 29/623.5 |
| 5,827,620 A | 10/1998 | Kendall | 429/31 |
| 5,937,264 A | 8/1999 | Wallin | 419/2 |
| 5,993,988 A | 11/1999 | Ohara et al. | 429/40 |
| 6,017,647 A | 1/2000 | Wallin | 429/33 |
| 6,165,553 A | 12/2000 | Chen et al. | 427/240 |
| 6,230,494 B1 | 5/2001 | Botti et al. | 60/649 |
| 6,613,468 B2 | 9/2003 | Simpkins et al. | |
| 6,663,999 B2 * | 12/2003 | Van Berkel et al. | 429/45 |
| 7,186,475 B2 | 3/2007 | Shibata et al. | |
| 7,244,526 B1 | 7/2007 | Meinhardt et al. | |
| 7,351,491 B2 | 4/2008 | Sprenkle et al. | |
| 2004/0121222 A1 | 6/2004 | Sarkar et al. | |
| 2007/0122549 A1 * | 5/2007 | Hampden-Smith et al. | 427/197 |
| 2008/0038611 A1 * | 2/2008 | Sprenkle et al. | 429/30 |

\* cited by examiner

*Primary Examiner*—Shamim Ahmed
(74) *Attorney, Agent, or Firm*—Paul L. Marshall

(57) ABSTRACT

In one embodiment, the method of producing a ceramic assembly includes: disposing an electrode precursor on an electrolyte precursor having an electrolyte sintering shrinkage, disposing a stabilizer precursor having a stabilizer sintering shrinkage on the electrode precursor on a side opposite the electrolyte precursor to form a precursor assembly, and sintering the precursor assembly to form the ceramic assembly comprising a stabilizer layer, electrode, and electrolyte. The difference between the electrolyte sintering shrinkage and the stabilizer sintering shrinkage is less than or equal to ±1% and a surface of the ceramic assembly has less than or equal to about 5.0 degrees camber, as measured from the horizontal plane.

25 Claims, 2 Drawing Sheets

CERAMIC ASSEMBLY WITH A STABILIZER LAYER

"This invention was made with Government support under DE-FC26-02NT41246 awarded by DOE. The Government has certain rights in this invention."

BACKGROUND

Alternative transportation fuels have been represented as enablers to reduce toxic emissions in comparison to those generated by hydrocarbon fuels. At the same time, tighter emission standards and significant innovation in catalyst formulations and engine controls have led to dramatic improvements in the low emission performance and robustness of gasoline and diesel engine systems. This has certainly reduced the environmental differential between optimized and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, liquefied propane gas, etc.) to significant toxic and $CO_2$ emission improvements (natural gas, DME, etc.). Hydrogen is clearly the ultimate environmental fuel, with potential as a nearly emission free internal combustion engine fuel (including $CO_2$ if it comes from a non-fossil source). Unfortunately, the market-based economics of alternative fuels, or new power train systems, are uncertain in the short to mid-term.

The automotive industry has made very significant progress in reducing automotive emissions in both the mandated test procedures and in the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at larger incremental costs. Yet, even an "ultra low emission" certified vehicle may emit high emissions in limited extreme ambient and operating conditions or with failed or degraded components.

One approach to addressing the issue of emissions is the employment of fuel cells, particularly solid oxide fuel cells ("SOFC"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. SOFCs are constructed entirely of solid-state materials, utilizing an ion conductive oxide ceramic as the electrolyte. An electrochemical cell in a SOFC may comprise an anode and a cathode with an electrolyte disposed therebetween. The oxidant passes over the oxygen electrode (cathode) while the fuel passes over the fuel electrode (anode), generating electricity, water, and heat.

In a SOFC, a fuel flows to the anode where it is oxidized by oxygen ions from the electrolyte, producing electrons that are released to an external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

A SOFC cell stack also includes conduits or manifolds to allow passage of the fuel and oxidant into the stack, and byproducts, excess fuel, and oxidant out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes create oxidant and fuel flows across the electrodes that are perpendicular to one another.

Seals preferably are provided around the edges of the various cell stack components to inhibit crossover of fuel and/or oxidant. Seals may be disposed between electrodes and adjacent flow fields, around manifolds, between flow fields and cell separators, and elsewhere. One factor in establishing SOFC reliability is the integrity of these seals.

Leaks in manifold seals, electrochemical seals, or other defects may lead to the SOFC failure. Further, if molecular oxygen crosses over to the anode forming an oxidizing environment, anode oxidation may occur to create a chemical and volume change that may result in mechanical failure of the SOFC cell. Accordingly, flatness between components intended to form a seal may affect various aspects of solid oxide fuel cell systems.

As used herein, flatness is defined as having a horizontal surface without a slope, tilt, or curvature. Various phenomena may affect the flatness of a ceramic component. One of these phenomena is shrinkage mismatch between a porous nickel-yttria stabilized zirconia anode and a more dense yttria stabilized zirconia electrolyte. This may occur during sintering and may cause the component to become warped or to develop a camber (i.e., the condition of having or causing to have an arched surface). Shrinkage mismatch between two adjacent layers tends to manifest itself as edge curl in planar ceramic components. This problem also commonly leads to cracking due to internal stresses. Previous attempts directed to reduce or eliminate the degree of camber, or edge curl, formed when dissimilar materials are sintered together include the so-called creep flattening process in which the sintered cells are fired at high temperature under ceramic weights. This technique incorporates the use of flat plate (parts formed to a certain level of flatness, or machines to a flatness tolerance) that applies an equally distributed load across a heated ceramic planer cell or cell component. Upon approaching the sintering temperature of the ceramic part, flatness is achieved through high temperature creep in the material when maintained in this constrained environment over time. This method is used on parts that have already undergone the sintering process and are free of all combustible products, such as organics that have been added originally as processing aids. However, creep flattening is time consuming and requires large amounts of additional energy due to the firing times and the number of steps required. Also, creep flattening only reduces camber by a limited amount.

A second cause of camber in the sintered multilayer ceramic component is a mismatch in the coefficient of thermal expansion (CTE) between the two adjacent layers. This typically affects the shape of the whole ceramic planar multilayer part and is less significant at the edge. Upon cooling from the temperature required to co-sinter these layers, the two sintered layers contract at different rates due to differences in CTE. Due to the difference in inherent properties of the two materials joined to form the body, the mismatch could lead to significant camber. This camber cannot be removed via the creep flattening process. This camber can sometimes be reduced by design of the cell (i.e. one layer being much thicker than the other and dominate the contraction behavior).

Accordingly, there exists a need for flat ceramic cell components of solid oxide fuel cell systems, and a method of producing such components. In particular, a method to produce components in which the camber associated with mismatched shrinkage and CTE mismatch between fuel cell components during sintering and other aspects of fuel cell production is reduced or even eliminated. A need also exists for methods to produce flat ceramic cell components in a cost effective manner, requiring less energy than processes previously attempted.

SUMMARY

Disclosed herein are methods for producing ceramic assemblies and for producing solid oxide fuel cells, as well as the assemblies and fuel cells made therefrom. In one embodiment, the method of producing a ceramic assembly includes: disposing an electrode precursor on an electrolyte precursor having an electrolyte sintering shrinkage, disposing a stabilizer precursor having a stabilizer sintering shrinkage on the electrode precursor on a side opposite the electrolyte precursor to form a precursor assembly, and sintering the precursor assembly to form the ceramic assembly comprising a stabilizer layer, electrode, and electrolyte. The difference between the electrolyte sintering shrinkage and the stabilizer sintering shrinkage is less than or equal to ±1% and a surface of the ceramic assembly has less than or equal to about 5.0 degrees camber, as measured from the horizontal plane.

In one embodiment, the method of producing a solid oxide fuel cell comprises: disposing a first electrode precursor on a solid electrolyte precursor having an electrolyte sintering shrinkage, disposing a stabilizer precursor having a stabilizer sintering shrinkage on the first electrode precursor on a side opposite the electrolyte precursor to form a precursor assembly, disposing a second electrode precursor on a side of the solid electrolyte precursor opposite the first electrolyte, and sintering the precursor assembly to form the ceramic assembly comprising a stabilizer layer, first electrode, and electrolyte. The difference between the electrolyte sintering shrinkage and the stabilizer sintering shrinkage is less than or equal to ±5%, and a surface of the ceramic assembly has less than or equal to about 5.0 degrees camber, as measured from the horizontal plane.

The above described and other features are exemplified by the following figures and detailed description.

BRIEF DESCRIPTION OF THE DRAWINGS

Referring now to the drawing wherein like elements are numbered alike in the several figures.

DESCRIPTION OF THE PREFERRED EMBODIMENT

Different of SOFC system geometries exist, including rounded, polygonal (e.g., square and rectangular), and the like. Therefore, reference to a particular cell geometry and components for use within a particular cell geometry are intended to also represent similar components in other fuel cell geometries where applicable. Additionally, all ranges disclosed herein are inclusive and combinable (e.g., less than or equal to about 25, with about 5 to about 20 desired, and about 10 to about 15 more desired, includes about 10 to about 25, about 5 to about 15, etc.).

Generally, a vehicular system may comprise at least one SOFC stack, an engine, heat exchanger(s), and optionally, compressor(s), exhaust turbine(s), catalytic converter(s), particulate filter(s), nitrogen oxide adsorber(s), preheating device(s), plasmatron(s), electrical source(s) (e.g., battery, capacitor, motor/generator, turbine, and the like, as well as combinations comprising at least one of the foregoing electrical sources), reformer(s), and connections, wiring, control valves, and a multiplicity of electrical loads, including, but not limited to, lights, resistive heater(s), blower(s), air conditioning compressor(s), starter motor(s), traction motor(s), computer system(s), radio/stereo system(s), and a multiplicity of sensor(s) and actuator(s), and the like, as well as other components, and various combinations comprising at least one of these components.

Figure 1:
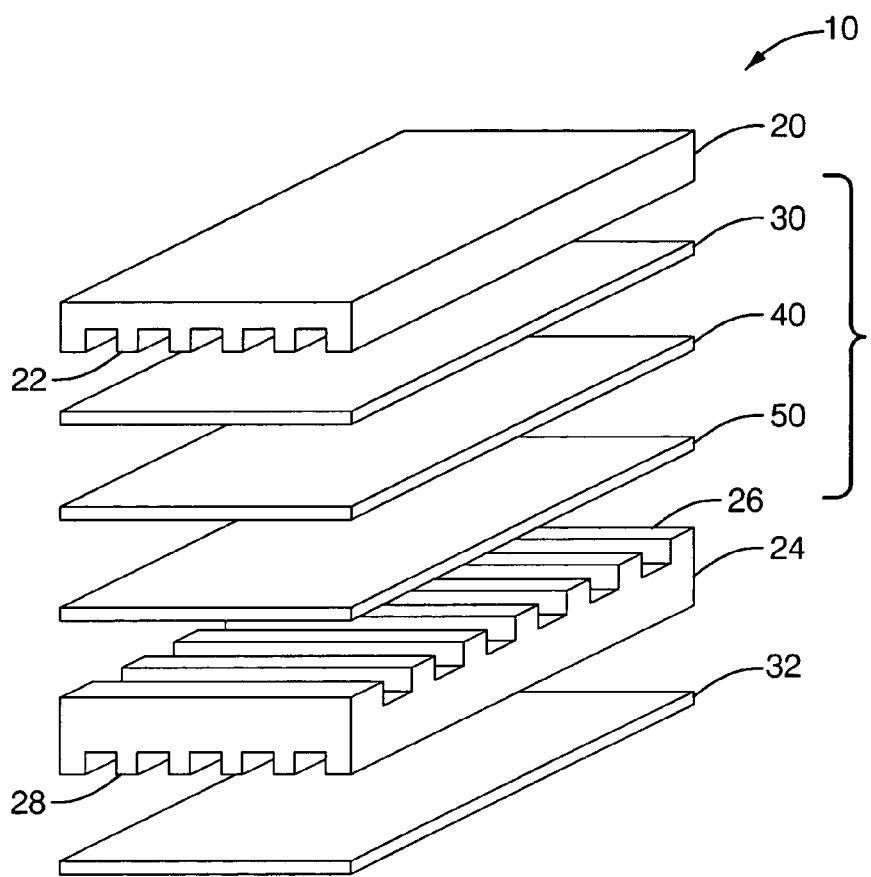
FIG. 1 is an expanded isometric view of an exemplary electrochemical cell of a SOFC.

As illustrated in FIG. 1, a SOFC system may include an SOFC stack 10. A fuel electrode or anode 30 and an oxygen electrode or cathode 50 are disposed on opposite sides of a solid electrolyte 40. An end cap 20 includes an inner surface 22 that is configured for disposal adjacent to the anode 30 for both electrical contact and also to provide fuel distribution. An interconnect 24 includes a first interconnect surface 26, and a second interconnect surface 28. First interconnect surface 26 is configured for disposal adjacent to the cathode 50 to provide oxidant distribution and electrical contact, and second interconnect surface 28 is configured for disposal adjacent to an anode 32 of another SOFC. Anode 32 is disposed adjacent to interconnect 24 to illustrate the placement of and ability to stack several SOFCs in electrical communication with another SOFC. Alternatively, an additional end cap 20 could be disposed adjacent to the cathode 50 with the surface 22 in fluid communication with the cathode 50.

The solid electrolyte 40 may be an ion conductor capable of transporting oxygen ions from the cathode 50 to the anode 30 and that is compatible with the environment in which the SOFC will be utilized (e.g., an operating temperature of 500° C. to 1,000° C. for the fuel cell to deliver power). Solid electrolyte materials may include ceramics and/or metals including zirconium, yttrium, calcium, magnesium, aluminum, rare earths, and the like, as well as oxides, gallates, aluminates, combinations, and composites comprising at least one of the foregoing materials. Preferably, the electrolyte comprises a rare earth oxide such as yttria, gadolinia, neodymia, ytterbia, erbia, ceria, and the like, and mixtures comprising at least one of the foregoing oxides that are doped with an aliovalient oxide (i.e., a $^{+2}$ valence metal oxide) such as magnesia, calcia, strontia, and the like, and combinations comprising at least one of the foregoing.

The anode 30 and cathode 50, which form phase boundaries (gas/electrolyte/catalyst particle; commonly known as triple points) with the electrolyte 40, may be disposed adjacent to or integral with the electrolyte 40. In general, the anode 30 and cathode 50 are formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), e.g., a porosity (i.e., pore volume based upon the total volume of the electrode) of about 20% to about 40% or so.

The composition of the anode 30 and cathode 50 may comprise elements such as zirconium, yttrium, nickel, manganese, strontium, lanthanum, perovskite, iron, cobalt, cerium, samarium, and the like, as well as oxides, alloys, and combinations comprising at least one of the foregoing. Preferably, the anode material is formed upon a ceramic skeleton, such as yttria-stabilized zirconia, for thermal compatibility. The electrodes (i.e., the anode, the cathode, or both) can be up to about 1,000 micrometers or so in thickness. Typically, the anode has a thickness, within this range, of greater than or equal to about 300 micrometers, with greater than or equal to about 400 micrometers preferred. Also preferred for the anode is a thickness of less than or equal to about 1,000 micrometers, with less than or equal to about 700 micrometers more preferred. For the cathode, the thickness, within this range, can be greater than or equal to about 10 micrometers, with greater than or equal to about 20 micrometers preferred. Also preferred for the cathode is a thickness of less than or equal to about 70 micrometers, with less than or equal to about 50 micrometers more preferred. If the electrodes are electrolyte supported, they can have a thickness of about 20 micrometers to about 50 micrometers, with about 20 micrometers to about 30 micrometers preferred.

Either or both the anode 30 and the cathode 50 may be formed directly on the electrolyte 40 by sintering of various layers of precursors formed into a layered precursor assembly. As used herein, the term precursor assembly may refer to an electrolyte-anode assembly, an electrolyte-cathode assembly, or a combination of the two. A precursor assembly is then fired to convert the various layers of precursors into their respective layers. In forming the precursor assembly, layers of precursors may be disposed onto/over each other (i.e., one on top of the other).

However, as discussed above, the flatness of various portions of the cell may affect seals formed between the various components of the SOFC system. Accordingly, the flatness of various portions of the cell assemblies may affect overall system performance. Shrinkage mismatch that may occur between the various materials during sintering may cause camber and warping of these surfaces otherwise intended to be flat. Thermal expansion mismatch is another contributor to the overall camber of the part, and affects all temperature ranges. It has been discovered that control and/or elimination of camber on the surface of either one or both of the electrode assemblies may be obtained by forming a stabilizer layer over the electrode side (i.e., the anode side and/or the cathode side) of the electrolyte-electrode bi-layer prior to sintering. This stabilizer layer desirably has similar shrinkage properties as compared to the electrolyte material (e.g., the difference in shrinkage characteristics between the electrolyte and the stabilizer layer (i.e., the layers disposed on opposite sides of the electrode), is less than or equal to about ±5%). Preferably the difference in shrinkage properties is less than or equal to about ±3%, with less than or equal to about ±1% more preferred, and identical shrinkage characteristics especially preferred. Without wishing to be bound by theory, it is believed that the similar shrinkage properties on each side of the electrode counter-balance the distortion caused by the shrinkage mismatch of the electrolyte and the electrode during sintering.

In addition to shrinkage properties, the thermal expansion of a stabilizer layer is also preferably matched with that of the electrolyte material. The difference in the coefficient of thermal expansion between the stabilizer precursor and the electrolyte precursor is preferably less than or equal to about ±5%, with less than or equal to about ±3% more preferred, less than or equal to about ±1% even more preferred, and identical especially preferred.

Figure 3:
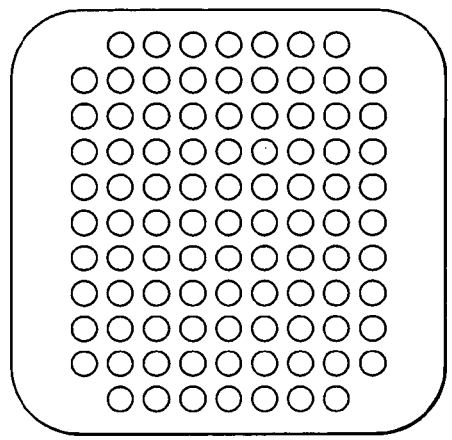
FIG. 3 is an exemplary illustration of a hole punched yttria stabilized zirconia layer.

Other properties considered with the stabilizer layer include porosity and electrical conductivity. In order to enable fuel/oxidant access to the appropriate electrode, the stabilizer layer has a porosity (open volume of holes and/or pores) that provides for sufficient transfer of materials into and out of the cell (e.g., fuel gas into and byproducts out of the anode, oxidant into and byproducts out of the cathode). The stabilizer layer also allows for electrical contact between an outside environment and the electrode itself. Electrical communication through the stabilizer layer can be attained in various fashions, such as an open-hole configuration that allows direct contact the electrode direct electrical communication through the stabilizing layer, e.g., through holes, wherein the holes can have any geometry (see FIG. 3), a mesh pattern (see FIG. 4), or otherwise. In the configuration illustrated in FIG. 3, the holes enable electrical and fluid communication between the electrode and subsequent cell components and/or the fuel/oxidant, while in FIG. 4 the communication is along the lines 72. These embodiments can be formed by a tape manufactured with an open hole, mesh, or similar pattern, wherein the design is only limited by the desired fluid and electrical communication through the layer. Alternatively, the precursor can be formed into a slurry that is applied by printing (e.g., screen printing), spraying, painting, and/or the like.

Figure 4:
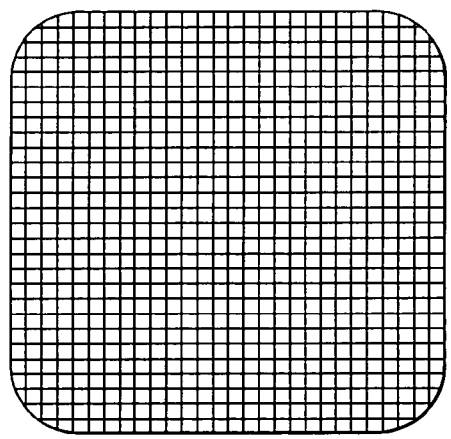
FIG. 4 is an exemplary illustration of a screen printed yttria stabilized zirconia layer.
Figure 5:
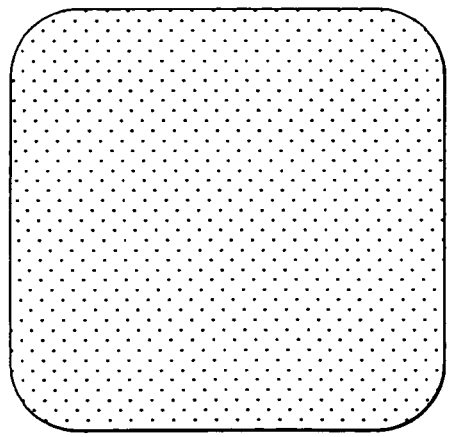
FIG. 5 is an exemplary illustration of a porous yttria stabilized zirconia layer.

Alternatively, the stabilizer layer can be porous such that fluid communication is established through the layer. Electrical conductivity (and communication) through the layer can be attained by impregnating the layer, preferably post sintering, with a conductive metal or metal oxide. Referring to FIGS. 4 and 5, a stabilizing layer precursor can be disposed over the desired electrode(s). This layer precursor can comprise a fugitive material (e.g., graphite, carbon black, starch, nylon, polystyrene, latex, other soluble organics (e.g., sugars and the like) and the like, as well as compositions comprising one or more of the foregoing fugitive materials) that burns off at a temperature below the sintering temperature to form voids in the fired layer. For example, the stabilizing layer could be formed from a solvent based or elastomer zirconia (e.g., yttria stabilized zirconia) precursor comprising carbon black (or the like). This stabilizer precursor could be formed in to a tape (e.g., a thick tape method, doctor blade method, or the like), or could be disposed on, sprayed, printed, painted, or otherwise applied to the electrode.

For a dense zirconia, partially covered area such as holes (e.g., any shaped hole, a grid or any other pattern, or the like (see FIGS. 3 and 4), the porosity of the stabilizer layer may be less than or equal to about 10%. Unless otherwise stated, the porosity herein refers to open porosity (when measured according to Archimedes or He pycnometry techniques). In this embodiment, the porosity can be closed porosity, since there are other ways (holes or grid pattern) for gas and electrical conductor to contact the anode surface. Preferably within this range, the porosity can be less than or equal to about 5%, with less than or equal to about 1% being more preferred. Additionally, since the electrical and fluid communication are established through openings in the stabilizer layer, the stabilizer layer covers less than all of the electrode, with less than or equal to about 95% coverage of the electrode possible, about 30% to about 90% coverage of the electrode generally desired, and about 40% to about 70% coverage more desirable. These openings can be formed in various fashions, such as disposing an elastomer or other fugitive material on the electrode in the desired pattern, prior to disposing the stabilizer precursor on the electrode, using a mask during the application of the stabilizer precursor to the electrode, and the like.

In contrast to where openings are used for electrical and/or fluid communication, enough porosity is desired for both gas flow and electrical connection, as well as sufficient stabilizing material to inhibit the camber. Therefore, it is desirable that this layer completely cover the surface of the electrode (e.g., anode) and desired that the porosity of this layer can be greater than or equal to 10%, and more desirably greater than or equal to about 20%. In this embodiment, the porosity can be about 20% to about 60%, and more desirably about 40% to about 60% open porosity. (See FIG. 5)

Although the thickness of the stabilizer layer can be less than or equal to about 50 micrometers, the thickness is desirably less than the thickness of the adjacent electrode. The thickness may be about 3 to about 15 micrometers or so, when measured according to scanning electron microscopy. Preferably within this range, the thickness is less than or equal to about 15, with less than or equal to about 10 micrometers being preferred, and less than or equal to about 8 micrometers more preferred. Also within this range, a thickness of greater than or equal to about 3 micrometers is preferred, with greater than or equal to about 5 micrometers being more preferred. If the stabilizing layer directly matches the electrolyte in regards to chemistry and density, then it is desired to have the same thickness as the electrolyte. However, if a fugitive material is used, or the chemistry is altered in any way, a different thickness can be employed to obtain the desired shrinkage and CTE.

A precursor assembly having a stabilizer layer is then fired ("sintered") to convert the various layers of precursors into their respective ceramic layers. In forming the precursor assembly, a layer of a stabilizer precursor is disposed over at least a portion of a layer of an electrode precursor, wherein the layer of the electrode precursor is disposed over a layer of an electrolyte precursor, such that at least a portion of the layer of the electrode precursor is located in between (i.e., sandwiched between) the layer of the stabilizer precursor and the layer of the electrolyte precursor.

The deposition of the various layers may include a variety of techniques such as sputtering, chemical vapor deposition, screen-printing, spraying (e.g., colloidal spraying, thermal spraying, and the like), dipping, painting, stenciling, among others. In addition, the precursor assembly may be prepared by depositing a slurry of the precursor directly onto, for example, one of the electrodes, or it may be formed by preparing a cast tape, preferably an elastomer based tape, comprising the precursor of the layer that is then laminated to a tape comprising a precursor of another layer of the assembly. For example, the layers can be tape casted into an elastomer based tape. The various layers can then be laminated together before firing. Subsequently, the cathode layer can be screen printed.

The precursor assembly, which now also includes a layer of a stabilizer precursor, is then sintered at a suitable temperature and for a period of time sufficient to produce a ceramic assembly having an electrode layer disposed in between at least a portion of a stabilizer layer and an electrolyte layer. The final, sintered electrolyte composition, for example, can be dense zirconia, fully stabilized with 8.0 mole percent (mol %) yttria.

A variety of configurations using a stabilizer layer are possible to reduce or eliminate camber due to mismatched shrinkage during sintering or CTE differences between adjacent layers. For example, in one embodiment, an elastomer-based tape comprising a precursor of a stabilizer layer is applied to a layer of an electrode precursor, which is disposed onto a layer of an electrolyte precursor. The tape may be porous (having open and connected pores through the microstructure) or have a dense microstructure with macroscopic holes or grid pattern in the design to allow gas flow and electrical connection. (e.g., have holes therethrough) and/or arranged on the electrolyte to provide sufficient transfer of materials in and out of the cell. Preferably, the tape includes an open hole or mesh pattern disposed within it thus allowing for electrical contact between the electrode covered, and an external environment.

For example, the elastomer based tape comprises a binder (such as polyvinyl butyral, ethocellulose, and the like) and a plasticizer (such as butyl benzyl phthalate, di-butyl phthalate, and the like) that are used to give the tape cast film strength and flexibility. The tape also comprises the oxide materials that will remain after firing and form a sintered, densified ceramic product. The tape is bonded with a warm isostatic laminator (approximately 85° C.). It could also be bonded by a platen laminator or roll laminator.

In another embodiment, a layer of a solvent-based slurry, dispersion, or paste comprising a stabilizer precursor is applied, preferably in an open hole or mesh pattern, onto a layer of an electrode precursor, which is disposed onto a layer of an electrolyte precursor. The slurry may be disposed using screen-printing, spraying, printing, or the like, or combinations comprising at least one of the foregoing methods. As above, the open hole or mesh pattern may allow for materials both in and out of the cell, as well as to provide electrical contact between the electrode covered and an external environment. Possible solvents for use in preparing the slurry include methyl ethyl ketone (MEK), ethanol, xylene, and the like. These solvents are chosen based on the degree of solubility of the binder/plasticizer system and the rate of drying during processing. The compositions are generally: a paste includes the organic vehicle and inorganic material, while the slurry includes the binder, plasticizer, dispersant, solvents, and inorganic material.

In yet another embodiment, an elastomer based tape comprising a stabilizer layer precursor and a fugitive material is applied to a layer of an electrode precursor, which is disposed onto a layer of an electrolyte precursor. The fugitive material is selected such that it is removed (i.e., burned off) at temperatures below the sintering temperature of the electrolyte, thus inducing porosity (e.g., causing voids to be present) in the fired ceramic.

Suitable fugitive materials for use herein include carbon based materials, amorphous carbon, crystalline carbon, graphite, corn starch, rice starch, polymer beads, and combinations comprising at least one of the foregoing. Graphite is a preferred fugitive material with amorphous carbon being more preferred.

After sintering, an electrically conductive material (such as nickel or others mentioned above) may be applied to improve electrical contact between the outer surface of the stabilizing layer (i.e., the side opposite the electrode), and the electrode itself. For example, a solvent based nickel slurry may be applied to the outer surface of the stabilizing layer such that diffusion of the slurry into the pore structure (or into the openings) of the stabilizing layer provides electrical contact between the outer surface of the stabilizing layer and the electrode layer over which the stabilizing layer is disposed. The conductive material is preferably printed onto the outer surface of the stabilizing layer in an open pattern having holes or spaces within it to allow for gas flow into and out of the electrode.

In still another embodiment, a layer of a solvent-based slurry comprising a stabilizer precursor and a fugitive material is applied to a layer of an electrode precursor disposed over a layer of an electrolyte precursor. The fugitive material is selected such that it is removed (i.e., burned off) at temperatures below the sintering temperature of the electrolyte, thus inducing porosity (e.g., causing voids to be present) in the fired ceramic. As described above, after sintering, a conductive material (such as nickel) may be applied to improve electrical contact between the outer surface of the stabilizing layer and the electrode itself.

The sintering conditions and other process variables depend on the particular precursors and other materials being used. However, a temperature of about 1,325° C. to about 1,450° C. is usually employed. Also, a sintering time of about 1.0 hour to about 3.0 hours, or so, is usually employed. (At the peak temperature, the entire firing process is actually approximately 30 to 36 hours).

As used herein, a surface may be considered flat if the camber on the surface is less than or equal to about 5.0° as measured from the horizontal plane. Camber of less than or equal to about 3.0° can be obtained, with less than or equal to about 1.0° preferred.

The stabilizer layer may include any material compatible with the environment of a SOFC (e.g., compatible with an operating temperature of about 500° C. to about 1,000° C.) and that corresponds to the CTE and shrinkage of the electrolyte, i.e., that helps to control and/or eliminate warpage and camber. The stabilizer layer can comprise, for example, materials employed in the electrolyte, such as ceramics and/or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. More preferably, the stabilizer layer comprises a rare earth oxide (such as yttria, gadolinia, neodymia, ytterbia, erbia, ceria, and the like, and mixtures comprising at least one of the foregoing oxides) doped with aliovalient oxide(s) (such as magnesia, calcia, strontia, and the like, and other $^{+2}$ valence metal oxides). The particular composition of the stabilizer layer is mostly dependent upon the particular electrolyte composition and the electrolyte's CTE and shrinkage characteristics. For example, for a yttria stabilized zirconia electrolyte, it is desirable for the stabilizer layer to comprise yttria stabilized zirconia.

Figure 2:
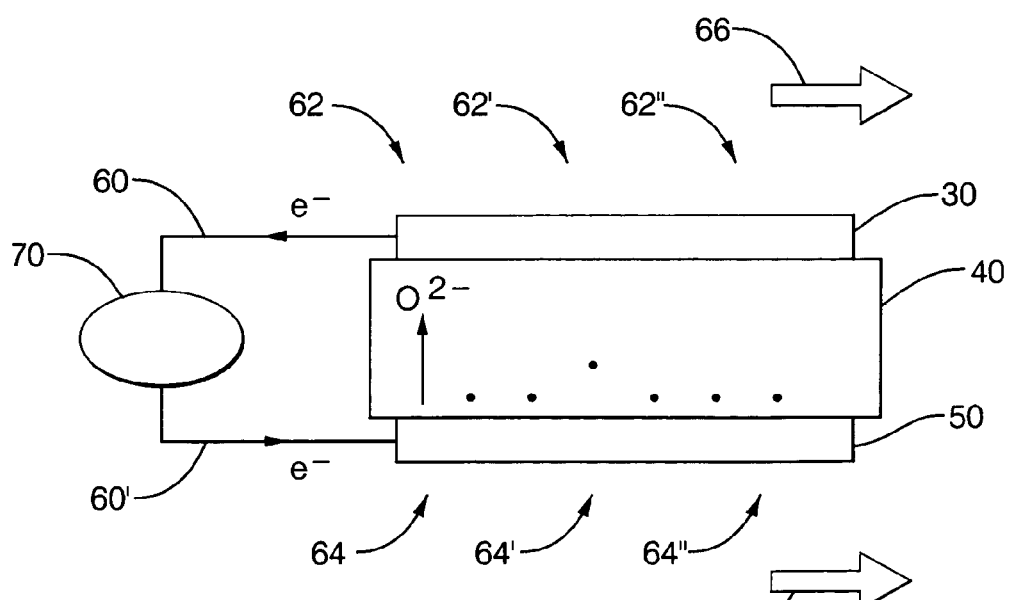
FIG. 2 depicts operation of an exemplary electrochemical cell of a SOFC.

Referring to FIGS. 1 and 2, the electrochemical cell 10 may be electrically connected with other electrochemical cells by using, for example, interconnect 24. Depending upon the geometry of the SOFC, the fuel and the oxidant flow to the anode or cathode (as appropriate) via the passageways of end cap 20 and the interconnect 24. The end cap 20 and the interconnect 24 are generally formed of a material capable of withstanding the pressures and temperatures of the SOFC, and capable of conducting electricity. For example, suitable end caps and interconnects may be in the form of non-integral conductive wool, fibers (chopped, woven, non-woven, long, and the like), felt, mat, and the like, which are capable of withstanding automobile operating conditions (e.g., temperatures of about −40° C. to about 1,000° C.) and are electrically conductive material compatible with the oxidizing or reducing nature of the fuel cell environment. Some possible end caps and interconnects may comprise materials such as silver, copper, ferrous materials, strontium, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage, generally from about 0.5 to about 1.2 volts. Higher voltages are attained by electrically connecting a plurality of electrochemical cells in series to form a stack. The total number of cells forming a stack may range from 2 to several hundred, depending on power requirements, space and weight restrictions, economics, and the like.

The dimensions of each cell may vary generally depending on the spatial requirements and the desired output. Generally, SOFCs may be employed in areas ranging from a microscopic scale, wherein each cell has an area of several micrometers squared, to an industrial power generation scale, such as in a power plant wherein each cell has an area of several meters squared. Useful dimensions for SOFCs employed in automotive applications are between 50 and 200 squared centimeters per cell (cm$^2$/cell), but it will be understood that these dimensions may vary depending on various design considerations.

In operation, the electrochemical cell 10 produces a current flow as illustrated by current flow arrows 60, 60' as shown in FIG. 2. Oxidant gases, such as oxygen or air, may be introduced to the cathode side of the cell, flowing as illustrated by the oxidant flow arrows 64, 64', 64". The oxidant receives the flowing electrons (e$^-$) and converts them into oxygen ions (O$^{-2}$), which diffuse through the electrolyte 40 to the anode 30, as depicted in the following reaction:

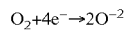

At the anode, the oxygen ions react with a fuel, such as hydrogen, carbon monoxide, methane, other hydrocarbons, or a combination comprising at least one of the foregoing fuels, which is introduced to the electrochemical cell 10 as illustrated by the fuel flow arrows 62, 62', 62". The reaction of the fuel and oxygen ions produces electrons (e$^-$), which flow outside of the electrochemical cell 10 to the external circuit 70 and back to the cathode 50. The fuel/oxygen ion reaction is depicted in the following reactions:

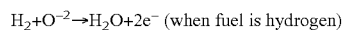

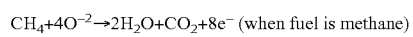

Unreacted fuel and byproducts, such as water, carbon monoxide, and carbon dioxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts the oxygen ions (O$^{-2}$) between the anode 30 and the cathode 50, maintaining an overall electrical charge balance. The cycle of flowing electrons (e$^-$) from the anode 30 through the external circuit 70 to the cathode 50 creates electrical energy for harnessing. This electrical energy may be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. The electricity produced by the SOFC is direct current that may be matched to the normal system voltage of the vehicle. This minimizes or avoids the need for devices such as diodes, voltage conversion and other losses, such as resistive losses in the wiring and in/out of the battery, associated with other vehicle systems and hybrid electrical systems. This high efficiency electricity allows electrification of the vehicle, including functions such as air conditioning and others, while allowing weight; fuel economy and performance advantages compared to other hybrid electric mechanization and internal combustion engine systems.

During start-up and for cabin heating, the SOFC may be operated at high adiabatic temperatures, e.g. up to about 1,000° C., subject to catalyst limitations, with typical operating temperatures of about 600° C. to about 900° C., and preferably about 650° C. to about 800° C. Consequently, at least one heat exchanger is preferably employed to cool the SOFC effluent and conversely heat the air prior to entering the SOFC, with heat exchangers generally employed.

To facilitate the production of electricity by the SOFC, a direct supply of simple fuel, e.g., hydrogen, carbon monoxide, and/or methane is preferred. However, concentrated supplies of these fuels are generally expensive and difficult to supply. Therefore, the fuel utilized may be obtained by processing a more complex fuel source. The actual fuel utilized in the system is chosen based upon the application, expense, availability, and environmental issues relating to the fuel. Possible fuels include hydrocarbon fuels, including, but not limited to, liquid fuels, such as gasoline, diesel, ethanol, methanol, kerosene, and others; gaseous fuels, such as natural gas, propane, butane, and others; and "alternative" fuels, such as hydrogen, biofuels, dimethyl ether, and others; synthetic fuels, such as synthetic fuels produced from methane, methanol, coal gasification or natural gas conversion to liquids, and combinations comprising at least one of the foregoing methods, and the like; as well as combinations comprising at least one of the foregoing fuels. The preferred fuel is based upon the type of engine employed, with lighter fuels, i.e., those which may be more readily vaporized and/or fuels which are readily available to consumers, generally preferred.

Furthermore, the fuel for the SOFC may be processed in a reformer. A reformer generally converts one type of fuel to a fuel usable by the SOFC (e.g., hydrogen). Mainly two types of reformer technologies are employed, steam reformers, which employ exothermic reaction, and partial oxidation reformers, which employ an endothermic reaction. Steam reformer technology is generally employed for converting methanol to hydrogen. Partial oxidation reformers are generally employed for converting gasoline to hydrogen. Typical considerations for the reformers include rapid start, dynamic response time, fuel conversion efficiency, size, and weight.

The SOFC may be used in conjunction with an engine, for example, to produce tractive power for a vehicle. Within the engine, SOFC effluent, air, and/or fuel are burned to produce energy, while the remainder of unburned fuel and reformed fuel is used as fuel in the SOFC. The engine may be any combustion engine including, but not limited to, internal combustion engines such as spark ignited and compression ignited engines, including, but not limited to, variable compression engines.

Similar to the engine, the turbine may be employed to recover energy from the engine effluent to produce tractive power and further to recover energy to operate the compressor(s) and preferably to generate electricity for various uses throughout the system and/or vehicle. The turbine employed may be any turbine useful in automotive or power generation applications. In one embodiment, the turbine and/or compressor may be accelerated or decelerated by a motor/generator to increase the compression (when required to increase the compression for optimal system performance) or to decrease compression (when excessive energy is available in the exhaust gases). For example, a high-speed electrical machine may be linked to the turbine and compressor.

After passing through the turbine, the SOFC effluent preferably enters a catalytic converter and/or other exhaust emission control device(s) in order to attain extremely low, nearly zero emissions of hydrocarbons and nitric oxide. The catalytic converter is typical of those used in automotive applications, including those employing noble metals and alloys thereof, such as platinum, rhodium and palladium catalysts and alloys, among others. Possible emission control devices include evaporative emissions devices, scrubbing devices (e.g., hydrocarbon, sulfur, and the like), particulate filters/traps (e.g., catalyzed and non-catalyzed diesel particulate filters/traps, and the like), catalytic converter(s) (e.g., three way catalysts, HC and CO catalysts, oxidation catalysts, and the like), adsorbers/absorbers, reactors (e.g., non-thermal plasma reactors, and the like), and the like.

Optional equipment, which additionally may be employed, includes, but is not limited to, sensors and actuators, heat exchangers, a battery, a fuel reformer, a burner, a phase change material, a thermal storage system, a plasmatron, a desulfurizer, or combination comprising at least one of the foregoing optional equipment. Desulfurizer equipment may also be employed, for example, if the fuel is rich in sulfur, or if the catalyst employed in the SOFC is particularly intolerant to sulfur, such as nickel-based catalysts.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method of producing a ceramic assembly, comprising:
disposing an electrode precursor on an electrolyte precursor having an electrolyte sintering shrinkage;
disposing a stabilizer precursor having a stabilizer sintering shrinkage on the electrode precursor on a side opposite the electrolyte precursor to form a precursor assembly, wherein a difference between the electrolyte sintering shrinkage and the stabilizer sintering shrinkage is less than or equal to ±1%; and
sintering the precursor assembly to form the ceramic assembly comprising a stabilizer layer, electrode, and electrolyte, wherein a surface of the ceramic assembly has less than or equal to about 5.0 degrees camber, as measured from the horizontal plane.

2. The method of claim 1, wherein the stabilizer layer has a stabilizer thickness of less than an electrode thickness.

3. The method of claim 2, wherein the thickness is about 3 micrometers to about 15 micrometers.

4. The method of claim 3, wherein the thickness is about 3 micrometers to about 10 micrometers.

5. The method of claim 4, wherein the thickness is about 5 micrometers to about 8 micrometers.

6. The method of claim 1, wherein the stabilizer layer has a porosity of less than or equal to about 10%, and wherein fluid communication through the stabilizer layer to the electrolyte is through openings in the stabilizer layer.

7. The method of claim 6, wherein the openings extend from one side of the stabilizer layer to an opposite side and comprise holes.

8. The method of claim 7, wherein the holes are in the pattern of a grid.

9. The method of claim 6, wherein the porosity is less than or equal to about 5%.

10. The method of claim 9, wherein the porosity is less than or equal to about 1%.

11. The method of claim 6, wherein the stabilizer layer covers less than or equal to about 95% of the electrode.

12. The method of claim 11, wherein the stabilizer layer covers about 30% to about 90% of the electrode.

13. The method of claim 6, further comprising disposing an elastomer on the electrode precursor in a desired pattern prior to disposing the stabilizer precursor on the electrode, wherein the elastomer forms the holes in the stabilizer layer.

14. The method of claim 1, wherein the stabilizer layer has a porosity of greater than or equal to about 20%, and wherein fluid communication through the stabilizer layer to the electrolyte is through pores.

15. The method of claim 14, wherein the porosity is about 20% to about 60%.

16. The method of claim 15, wherein the porosity is about 40% to about 60%.

17. The method of claim 15, wherein the stabilizer precursor comprises a fugitive material.

18. The method of claim 1, wherein the stabilizer layer and the electrolyte layer comprise the same material.

19. The method of claim 1, wherein a difference between an electrolyte coefficient of thermal expansion and a stabilizer coefficient of thermal expansion is less than or equal to about ±5%.

20. The method of claim 19, wherein the difference is less than or equal to about ±3%.

21. The method of claim 20, wherein the difference is less than or equal to about ±1%.

22. The method of claim 1, wherein the camber is less than or equal to about 3.0°.

23. The method of claim 1, wherein the camber is less than or equal to about 1.0°.

24. The method of claim 1, further comprising applying an electrically conductive material to a side of the stabilizer layer opposite the electrode.

25. A method of producing a solid oxide fuel cell, comprising:
  disposing a first electrode precursor on a solid electrolyte precursor having an electrolyte sintering shrinkage;
  disposing a stabilizer precursor having a stabilizer sintering shrinkage on the first electrode precursor on a side opposite the electrolyte precursor to form a precursor assembly, wherein a difference between the electrolyte sintering shrinkage and the stabilizer sintering shrinkage is less than or equal to ±5%;
  disposing a second electrode precursor on a side of the solid electrolyte precursor opposite the first electrode precursor; and
  sintering the precursor assembly to form the ceramic assembly comprising a stabilizer layer, first electrode, and electrolyte, wherein a surface of the ceramic assembly has less than or equal to about 5.0 degrees camber, as measured from the horizontal plane.

* * * * *